United States Patent [19]

Davis

[11] Patent Number: 4,722,037
[45] Date of Patent: Jan. 26, 1988

[54] HOLOGRAPHIC DEVICE FOR GENERATING MULTIPLE BEAMS OF LIGHT

[76] Inventor: Charles S. Davis, 51 Wooster St., New York, N.Y. 10012

[21] Appl. No.: 897,296

[22] Filed: Aug. 15, 1986

[51] Int. Cl.$^4$ .......................... F21V 9/00; F21V 11/00
[52] U.S. Cl. ...................................... 362/231; 362/235; 362/331; 350/3.72
[58] Field of Search ...................... 350/3.65, 3.7, 3.72, 350/3.73, 3.75, 3.77, 3.85; 362/235, 236, 240, 245, 329, 331, 332, 335, 231

[56] References Cited

U.S. PATENT DOCUMENTS

| | | | |
|---|---|---|---|
| 1,193,519 | 8/1916 | Crownfield | 362/240 |
| 1,798,132 | 3/1931 | Bredsvold | 362/236 |
| 3,403,283 | 9/1968 | Chernow et al. | 350/3.75 X |
| 3,578,838 | 5/1971 | Hallock | 350/3.5 |
| 3,619,021 | 11/1971 | Biedermann et al. | 350/3.5 |
| 3,635,538 | 1/1972 | Caulfield | 350/3.75 X |
| 3,695,744 | 10/1972 | Clay | 350/3.5 |
| 3,708,217 | 1/1973 | McMahon | 350/3.5 |
| 3,865,464 | 2/1975 | Kasahara et al. | 350/3.77 |
| 3,901,578 | 8/1975 | Hudson | 350/3.73 |
| 3,909,111 | 9/1975 | Meyerhofer | 350/117 |
| 3,912,921 | 10/1975 | Howe et al. | 240/9.5 |
| 3,957,353 | 5/1976 | Fienup et al. | 350/3.5 |
| 3,970,358 | 7/1976 | Kozma | 350/3.72 |
| 4,076,370 | 2/1978 | Wako | 350/3.75 |
| 4,109,304 | 8/1978 | Kavalovsky et al. | 362/259 |
| 4,245,882 | 1/1981 | Chang | 362/223 |
| 4,420,218 | 12/1983 | Rubanov et al. | 350/3.77 X |
| 4,432,044 | 2/1984 | Lautzenheiser | 362/223 |

FOREIGN PATENT DOCUMENTS

| | | | |
|---|---|---|---|
| 0136774 | 7/1979 | Fed. Rep. of Germany | 350/3.77 |
| 557511 | 8/1923 | France | 362/240 |
| 0095375 | 6/1983 | Japan | 350/3.75 |
| 2041189A | 9/1980 | United Kingdom | 362/240 |

OTHER PUBLICATIONS

P. Hariharan, Optical Holography, 1984, pp. 41-62, 162-193, Principles, Techniques and Applications, Cambridge Studies in Modern Optics.

Herb Brody, Holography Creates New Breed of Optical Components, High Technology, Jul./Aug., Thin, Lightweight Holograms Mimic Lenses to Infiltrate Optical Systems.

IBM Technical Disclosure, Aug. 1967, Formation of Optical Elements by Holography, G. T. Sincerbox, vol. 10, No. 3.

R. T. Ingwall, H. L. Fielding, Proceedings of SPIE-The International Society for Optical Engineering, Applications of Holography, Jan. 21-23, 1985, Los Angeles, CA, Polaroid Corporation, vol. 523.

Primary Examiner—Albert W. Davis, Jr.
Assistant Examiner—Richard R. Cole
Attorney, Agent, or Firm—Brumbaugh, Graves, Donohue & Raymond

[57] ABSTRACT

Optical assemblies having a plurality of light sources of differing spectral characteristics utilize holographic optical elements to produce a separate beam pattern for each light source. The optical assemblies are useful, for example, for producing high and low beams of an automobile headlight.

7 Claims, 2 Drawing Figures

HOLOGRAPHIC DEVICE FOR GENERATING MULTIPLE BEAMS OF LIGHT

BACKGROUND OF THE INVENTION

The present invention relates to optical assemblies which direct light from two light sources of different spectral characteristics into two different beam patterns, and particularly to the use of such optical assemblies as automobile headlights. Related inventions are described in my prior U.S. Pat. No. 4,536,833 and in my copending applications Ser. Nos. 897,294, 897,295, and 897,292.

There are currently two different methods of generating multiple light beams or patterns of light distribution. One method uses multiple light sources and a common set of optics while the other uses a fixed light source and multiple optical elements. Each of the techniques has specific trade-offs associated with it.

The first technique is commonly applied to generating the high and low beams of an auto headlight. To accomplish this, two spatially fixed light sources and reflectors are used with a single lens element. The lens is designed to generate two different light distribution patterns, corresponding to the high and low beams, depending on which of the light sources is energized. The lens design, optimized to work for both desired beams, sacrifices overall efficiency to heat loss and glare.

The second technique, presently employed in optical scanners and bar code readers, utilizes a fixed light source and multiple optical elements moved in the path of the light source by a motor. Each optical element is designed to change the path of the light at one specific angle and is extremely precise. These systems tend to be complex and therefore, expensive; and, because they are motorized, the overall reliability of the system is reduced.

BRIEF DESCRIPTION OF THE INVENTION

Optical assemblies according to the invention provide improved efficiency and reduced glare by producing multiple beam patterns using a plurality of light sources of different spectral characteristics, and a holographic optical element adapted to diffract light from the two light sources into different beam patterns. The optical assemblies are useful as automobile headlights to produce high or low beam illumination of the roadway, depending on which light source is turned on.

DETAILED DESCRIPTION OF THE INVENTION

Figure 1:
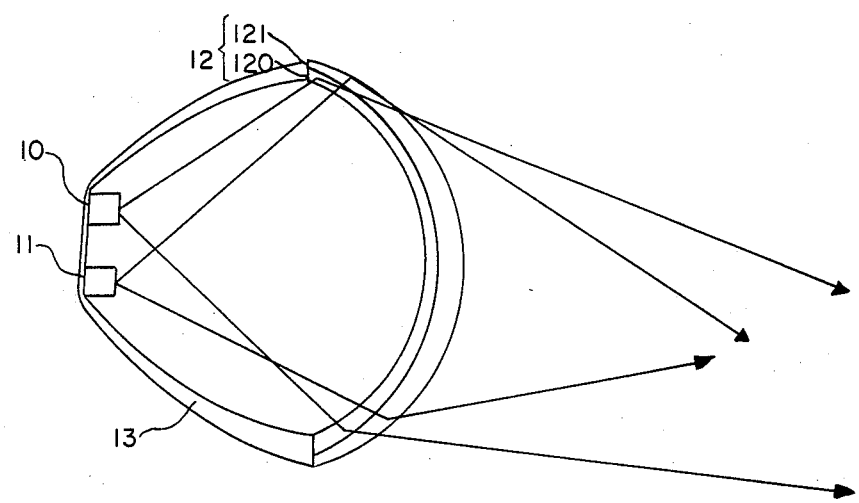
FIG. 1 shows a ray diagram for a two beam light source according to the invention.

FIG. 1 depicts in cross section an optical assembly according to the invention having two light sources 10 and 11 disposed adjacent to a holographic optical element 12. The light sources 10 and 11 produce radiation of different spectral characteristics, i.e., of different colors. The holographic optical element 12 is made up of two parts 120 and 121.

The first part 120 of the holographic optical element 12 is a hologram which diffracts light of the color produced by the first light source 10, but which transmits with minimal diffraction light from the second light source 11. The beam pattern of the diffracted light is selected during the formation of the holographic first part 120 depending on the application intended. For example, radiation from light source 10 can be diffracted in a pattern suitable for use as the low beam of an automobile headlight.

The second part 121 of the holographic optical element 12 is a hologram which diffracts light of the color produced by the second light source 11, but which transmits with minimal diffraction light of the color produced by the first light source 10. The second part 120 of the holographic optical element 12 is formed so as to diffract the radiation from the second light source 11 in a second beam pattern distinct from the first beam pattern. For example, the beam pattern from light source 11 may be suitable for use as the high beam of an automobile headlight.

The optical assemblies according to the invention may advantageously include a reflector 13 which collects radiation from the light sources 10 and 11 and directs it toward the holographic optical element 12. This reflector can be a conventional enamelled, vacuum metallized or polished metal reflector, or it can be a holographic reflector.

Figure 2:
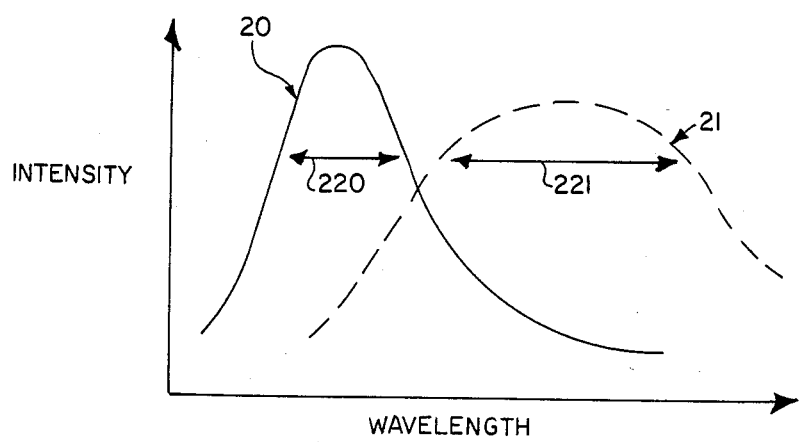
FIG. 2 shows the spectral characteristics of two light sources useful in the invention.

FIG. 2 shows preferred spectral distributions for two light sources for use in the invention. As shown, the first light source 10 produces light having a first spectral distribution 20. The second light source 11 produces light having a second spectral distribution 21. Preferably, the two spectral distributions 20 and 21 have minimal overlap, thus allowing for maximum resolution of the two beams.

The first part 120 of the holographic optical element 12 is selected to diffract the majority of light within spectral distribution 20, for example the range marked by arrow 220. The second part 121 of the holographic optical element 12 is selected to diffract the majority of light within spectral distribution 21, for example the range marked by arrow 221. When the two spectral distribution 20 and 21 do not overlap, the radiation from each light source can be separately directed in the desired beam pattern.

It is not, however, required that the two light sources produce completely nonoverlapping spectra. If a portion of the radiation from one of the sources can be diffracted by both parts 120 and 121 of the holographic optical element 12, this portion of the radiation will follow the beam pattern of the last encountered, i.e., the outermost, hologram. As a result, a part of the light from, for example, the high beam source would end up following the low beam path, or vice versa.

Holographic optical elements are formed by the interaction of two light beams, a collimated reference beam and an object beam, on a photosensitive recording medium. The interference pattern formed by the interaction of the two beams is fixed in the recording medium to produce the holographic optical element. A collimated beam impinging on this holographic optical element will be diffracted to recreate the object beam.

Transmissive and reflective holographic optical elements for use in light fixtures according to the invention can be made using any known technique, such as those described in P. Hariharan, *Optical Holography*, Cambridge Univ. Press (1984), and in U.S. Pat. Nos. 3,695,744; 3,909,111; 3,957,353; 3,970,358; and 4,245,882 which are incorporated herein by reference. For example, the holographic optical elements can be formed as volume holograms by imaging in a light sensitive dichromate impregnated gelatin, a photosensitive polymerizable monomer such as the vinyl monomers in Polaroid's DMP-128 system, a silver halide photographic emulsion, or other solid light sensitive medium. Alternatively, the holographic elements used can be surface relief holograms formed by imaging onto a film of photoresist followed by chemical etching or by other suitable techniques. It is advantageous from a production standpoint to be able to duplicate holographic elements using a mold taken from the original, or by some other means that eliminates the need for repetitive imaging.

The holographic optical elements may be multilayer structures. In this case, various layers of the holographic element are adapted to diffract a variety of wavelengths of light, and radiation of differing angles of incidence to provide efficient direction of the radiation from the light source. The individual layers can in fact be adapted to a particular light source and light fixture configuration by forming the holographic element using wavelengths of light and incident angles which predominate for a given light source and fixture.

For most applications, the holographic optical elements used are selected to provide substantially achromatic illumination upon reconstruction. That is, if white light is used in reconstructing the image, a substantially white beam of light results. Some colored fringes may be acceptable under these circumstances so long as they do not interfere with the white light illumination of the task area. It is within the scope of this invention, however, to exploit the chromogenic properties of the holographic optical element to produce regions of colored illumination from a white light source. Such chromogenic light fixtures might have applications, for example, in decorative lighting or stage lighting.

Light sources suitable for use in optical assemblies according to the inventin include incandescent, fluorescent and high intensity discharge types.

While the above-invention has been described in terms of two-light sources to produce two different beam patterns, the invention includes optical assemblies having greater numbers of light sources and beam patterns as well. For example, further light sources could be incorporated into an automobile headlight to provide for special purpose beam patterns including parking lights and fog lamps.

I claim:

1. An optical assembly for providing illumination comprising:
    (a) a first artificial light source providing light at a first wavelength;
    (b) a second artificial light source providing light at a second wavelength different from said first wavelength; and
    (c) a holographic optical element adapted to diffract light of said first and second wavelengths in different beam patterns, and positioned such that light from said first and second light sources is diffracted in said different beam patterns to provide illumination of two different regions in space.

2. An optical assembly according to claim 1, wherein the holographic optical element forms a part of a sealed envelope enclosing said first and second light sources.

3. An optical assembly according to claim 1, wherein the optical assembly is useful as an automobile headlight and said different beam patterns correspond to the high and low beams of conventional headlights.

4. An optical assembly according to claim 3, wherein the holographic optical element forms a part of a sealed envelope enclosing said first and second light sources.

5. An optical assembly according to claim 1, wherein the holographic optical element comprises a first holographic layer capable of diffracting light of said first wavelength in a first beam pattern, and a second holographic layer capable of diffracting light of said second wavelength in a second beam pattern.

6. An optical assembly according to claim 5, wherein said first and second holographic layers are separately formed surface holograms.

7. An optical assembly according to claim 5, wherein said first and second holographic layers are parts of a volume hologram.

* * * * *